A. L. RUTHVEN.
COMBINATION AUTOMATIC AND MANUAL AIR BRAKE SYSTEM AND AUTOMATIC TRAIN CONTROL AND SIGNAL MECHANISM.
APPLICATION FILED NOV. 4, 1915.
1,335,260.
Patented Mar. 30, 1920.
12 SHEETS—SHEET 6.
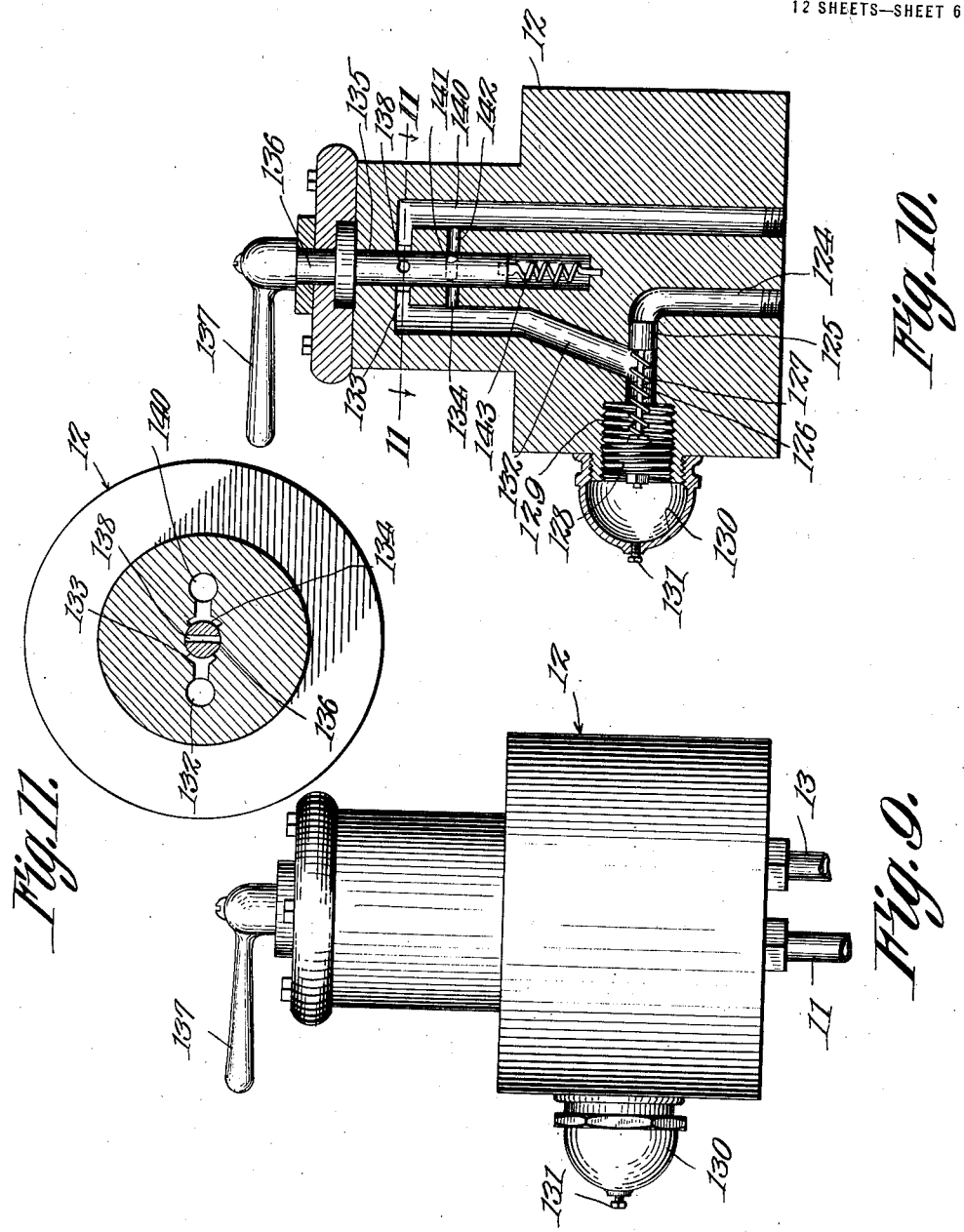

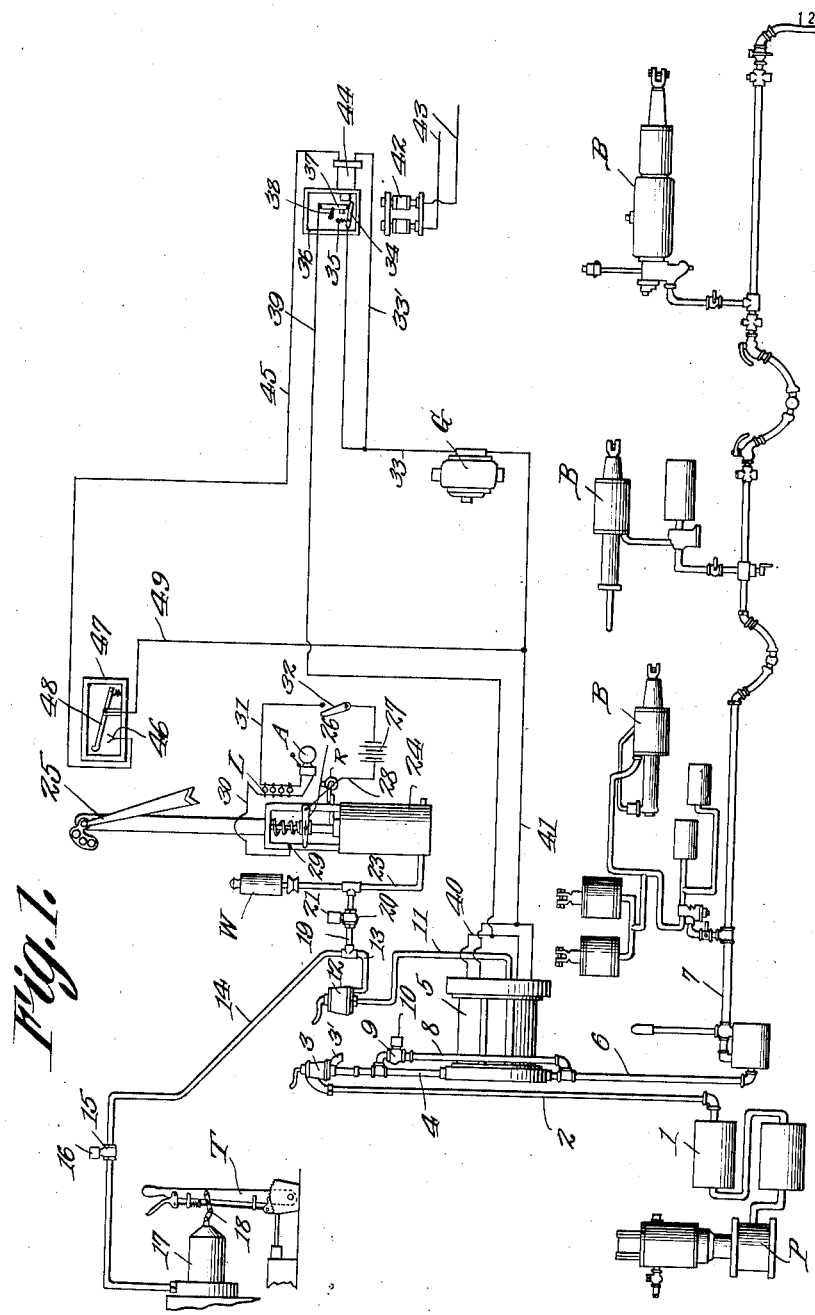

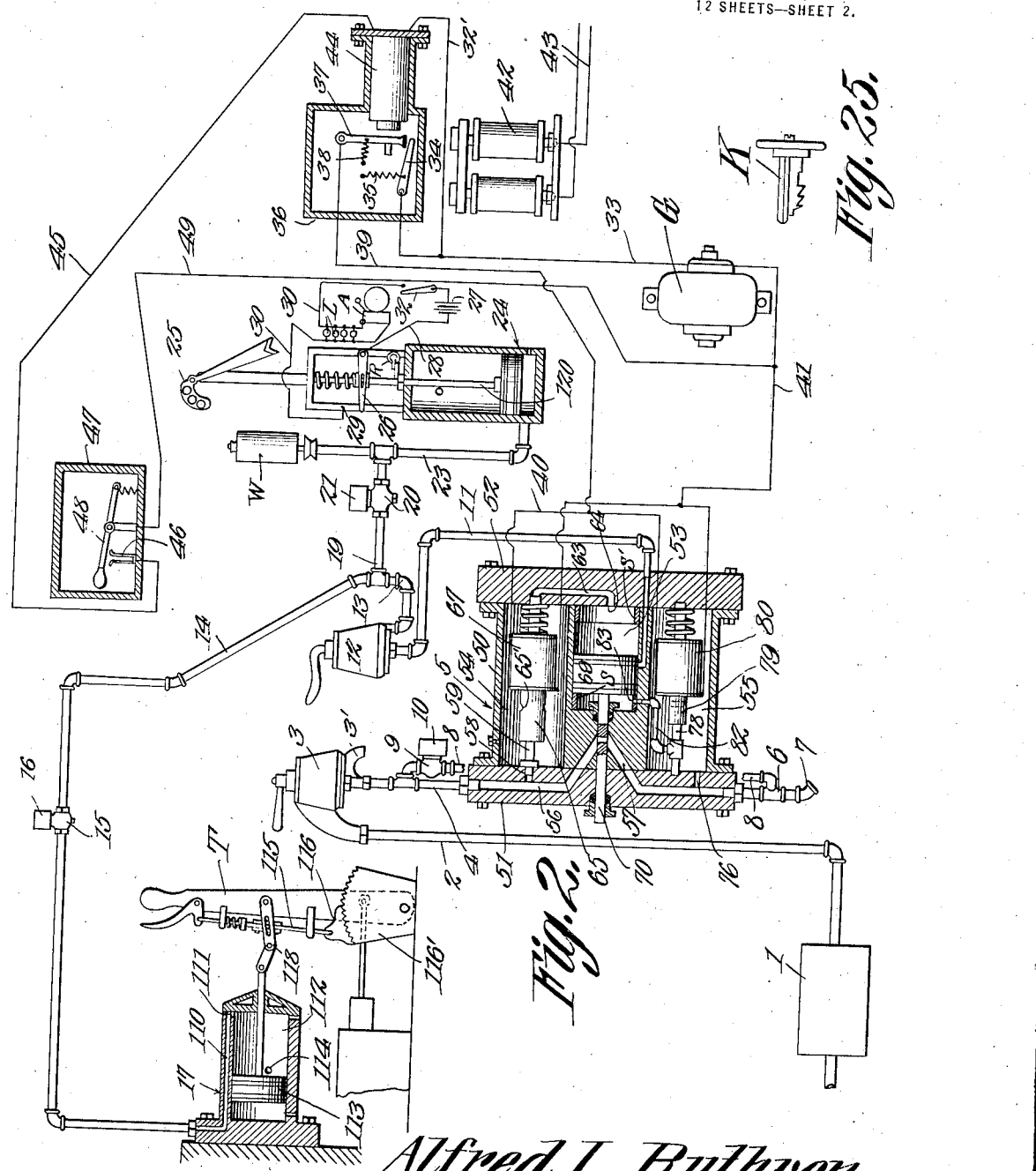

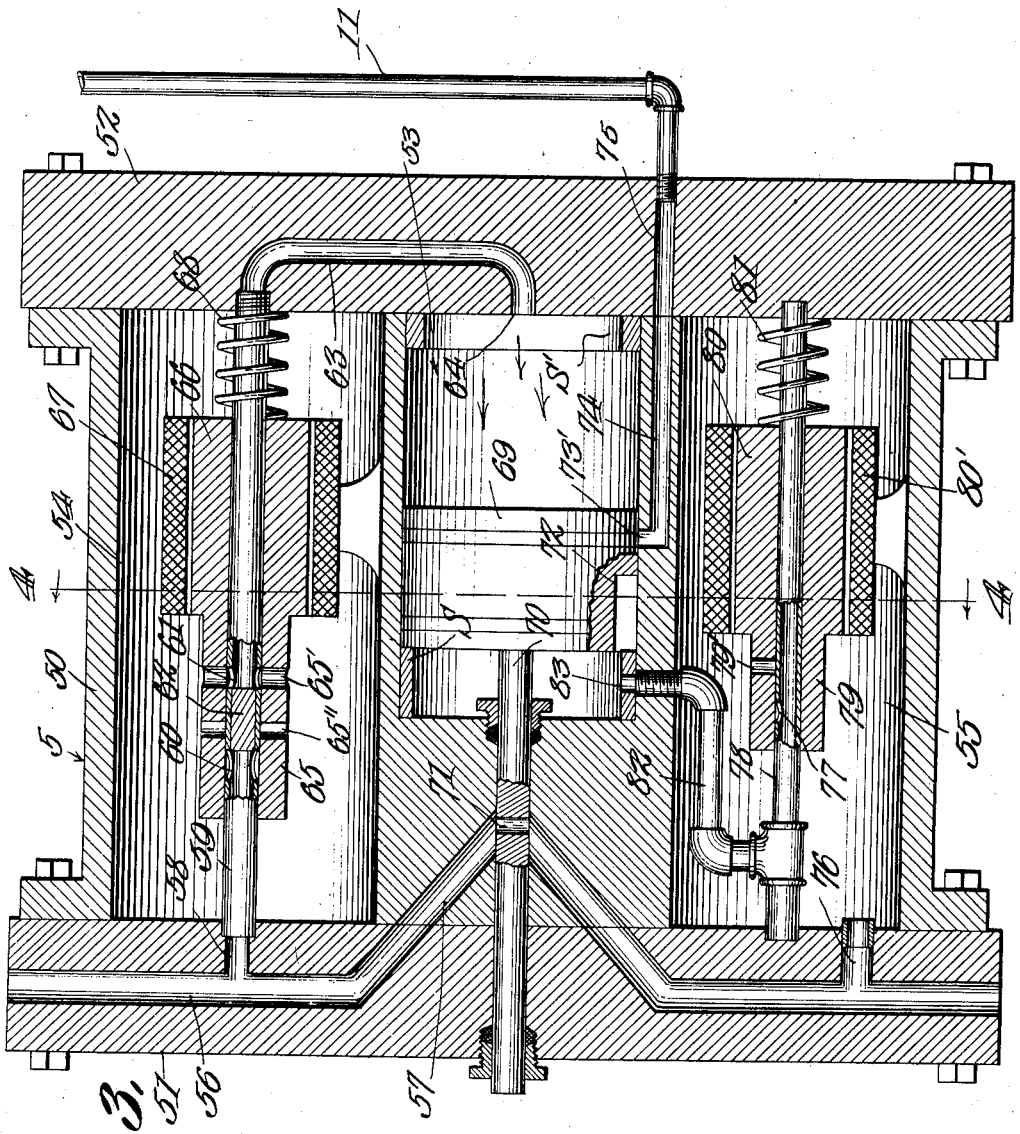

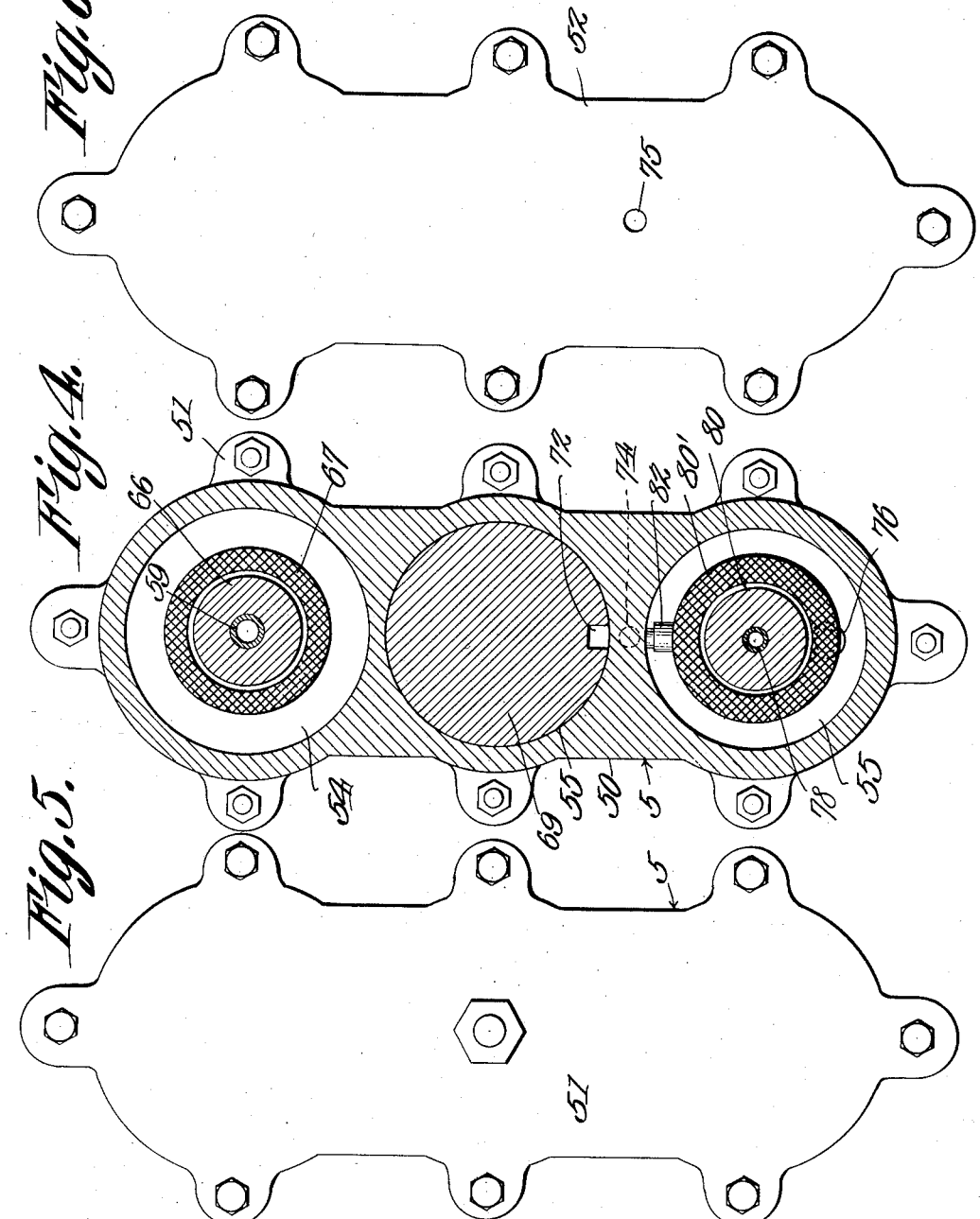

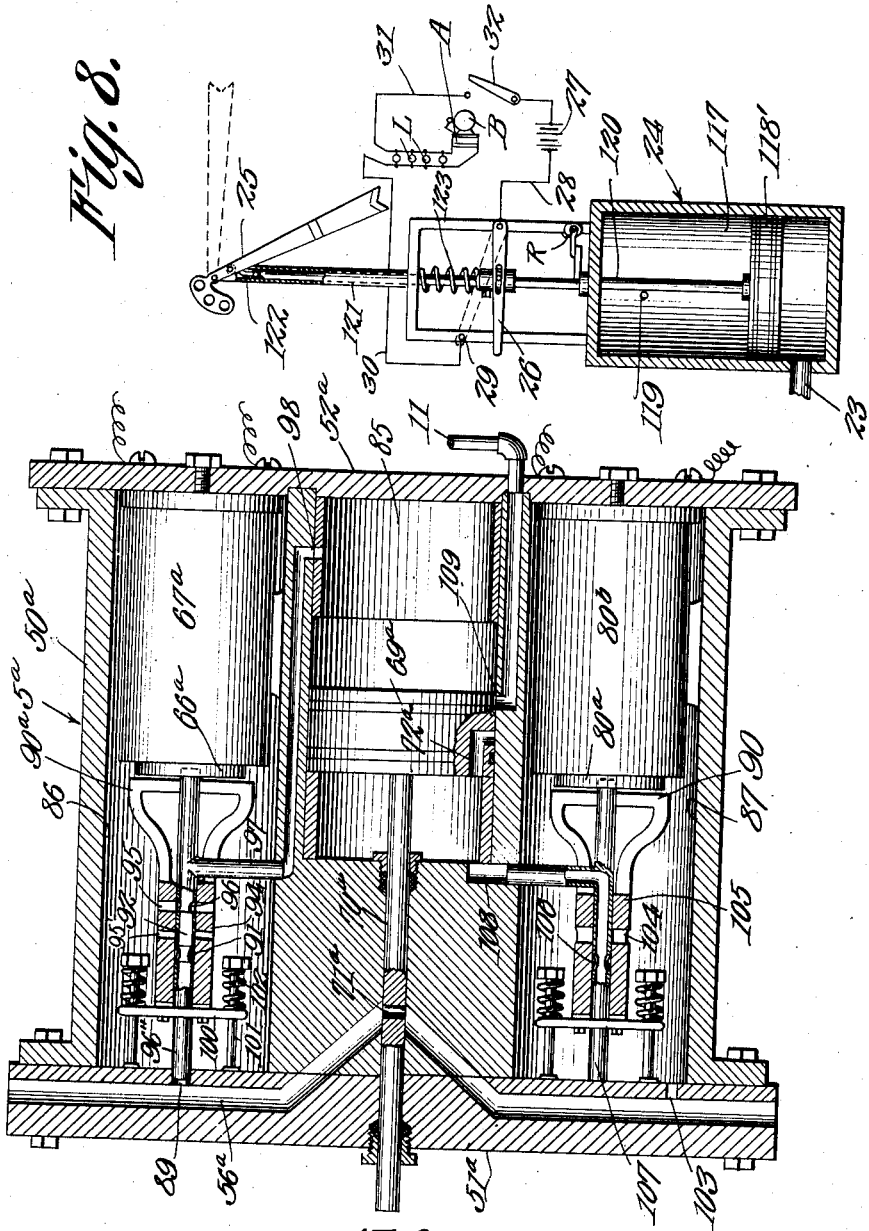

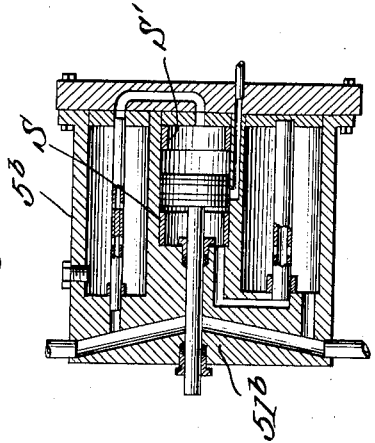
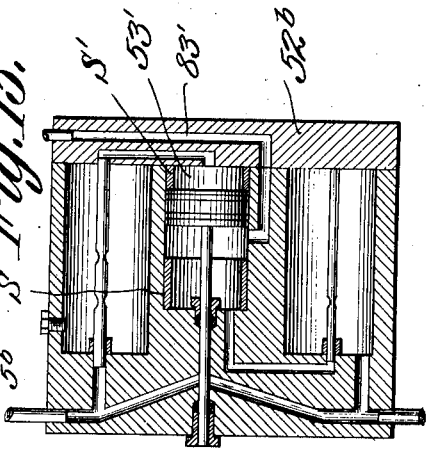
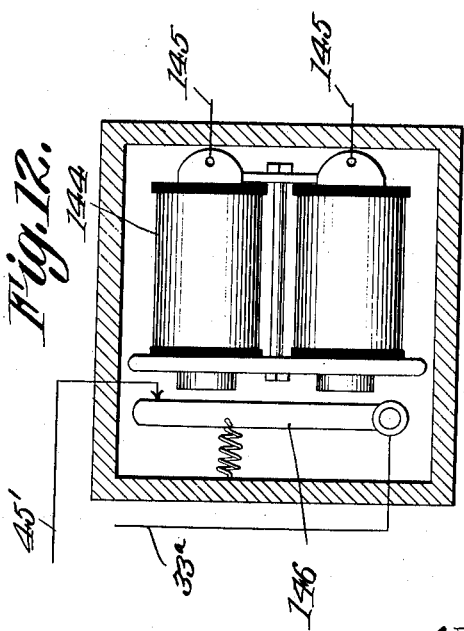
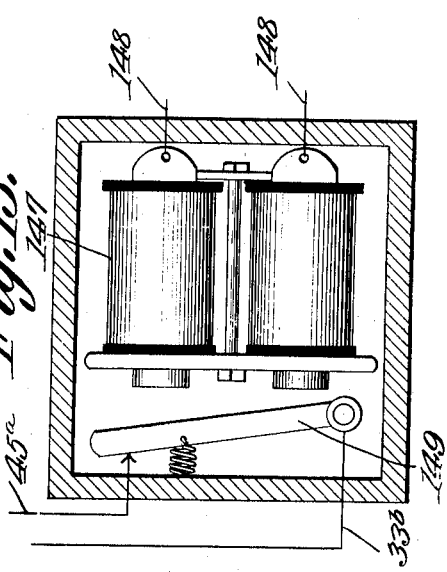

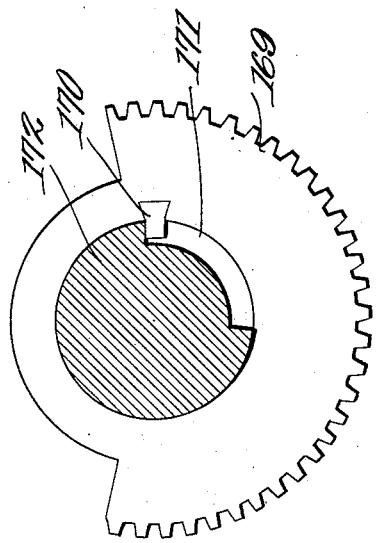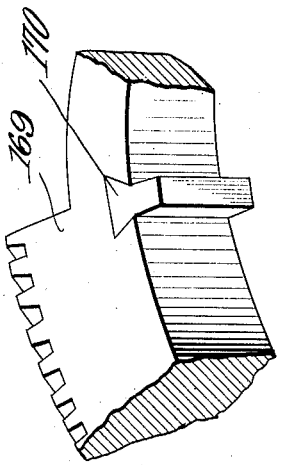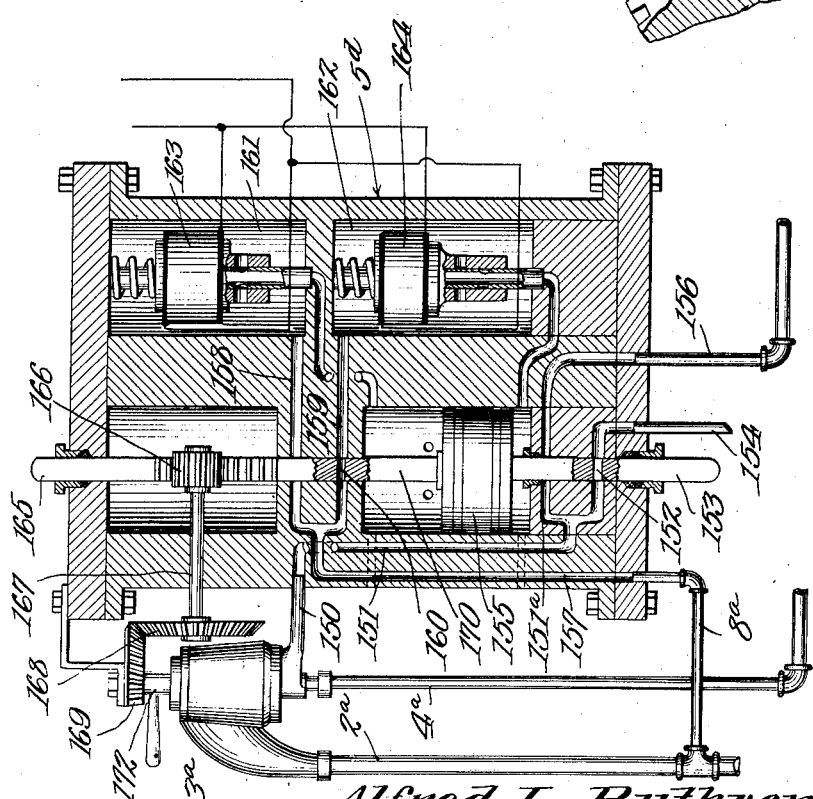

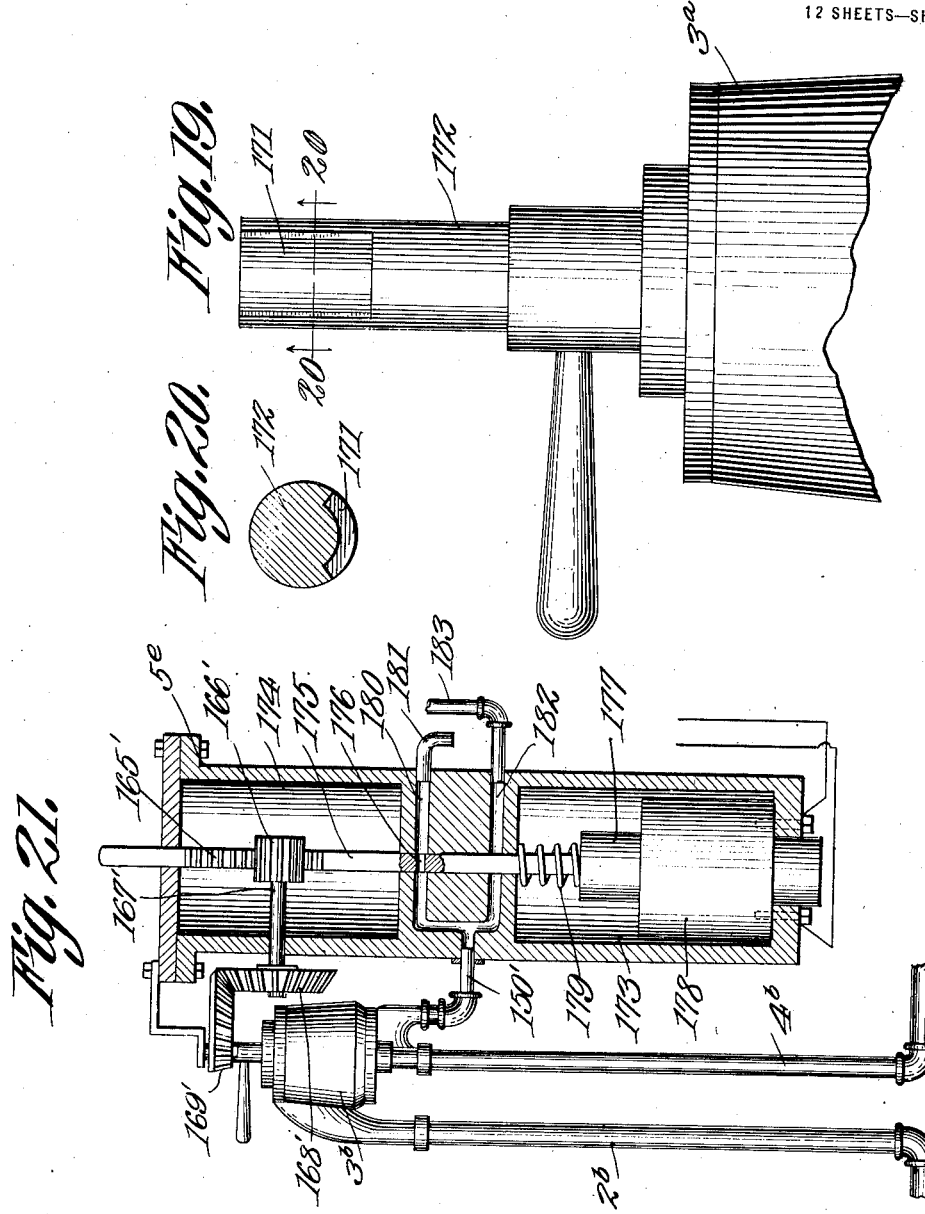

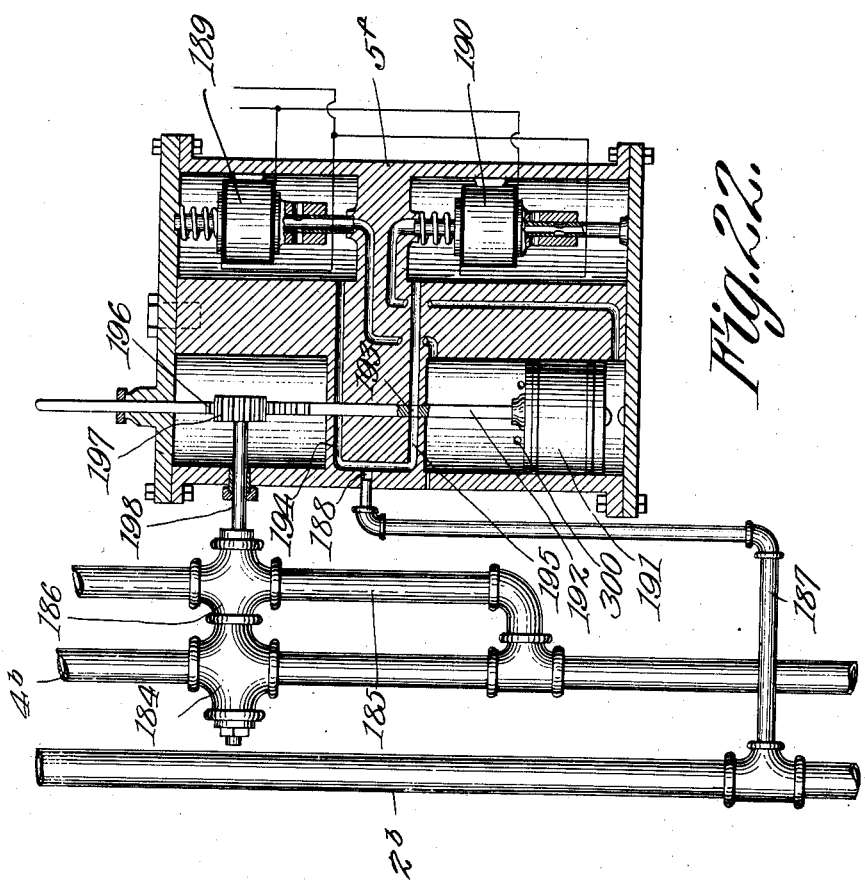

A. L. RUTHVEN.
COMBINATION AUTOMATIC AND MANUAL AIR BRAKE SYSTEM AND AUTOMATIC TRAIN CONTROL AND SIGNAL MECHANISM.
APPLICATION FILED NOV. 4, 1915.
1,335,260.  
Patented Mar. 30, 1920.  
12 SHEETS—SHEET 11.
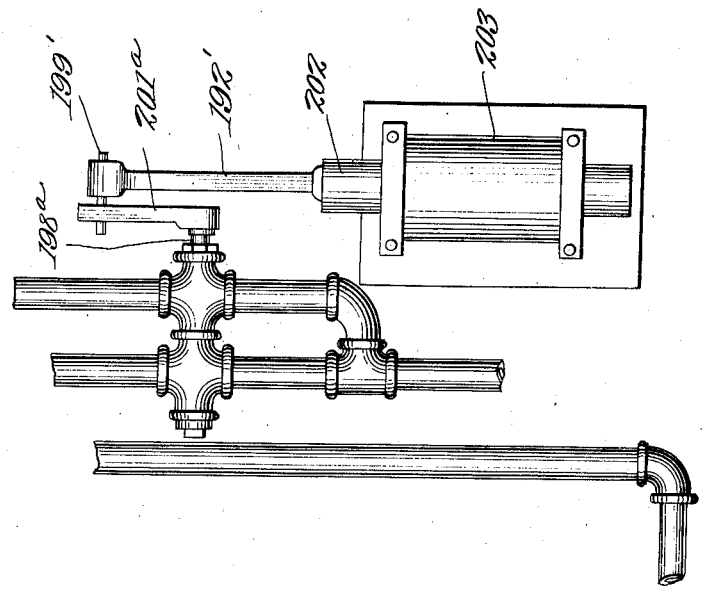
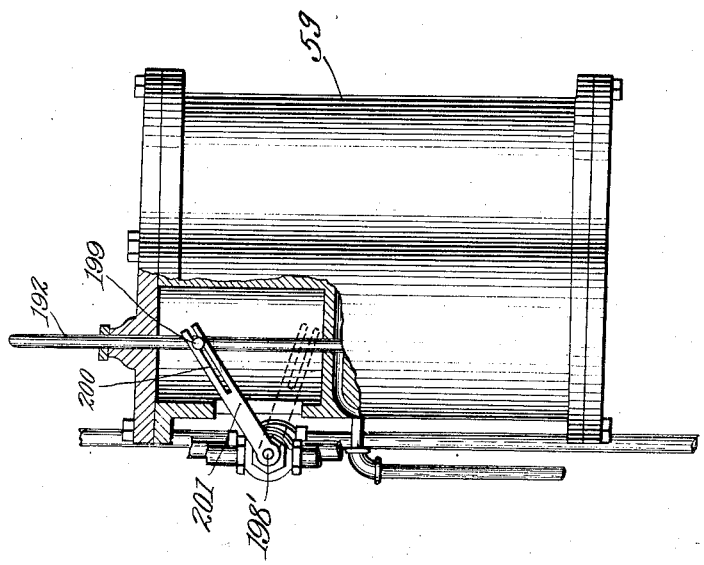
Witnesses
Alfred L. Ruthven
Inventor,
by C.A.Snow&Co.
Attorneys.

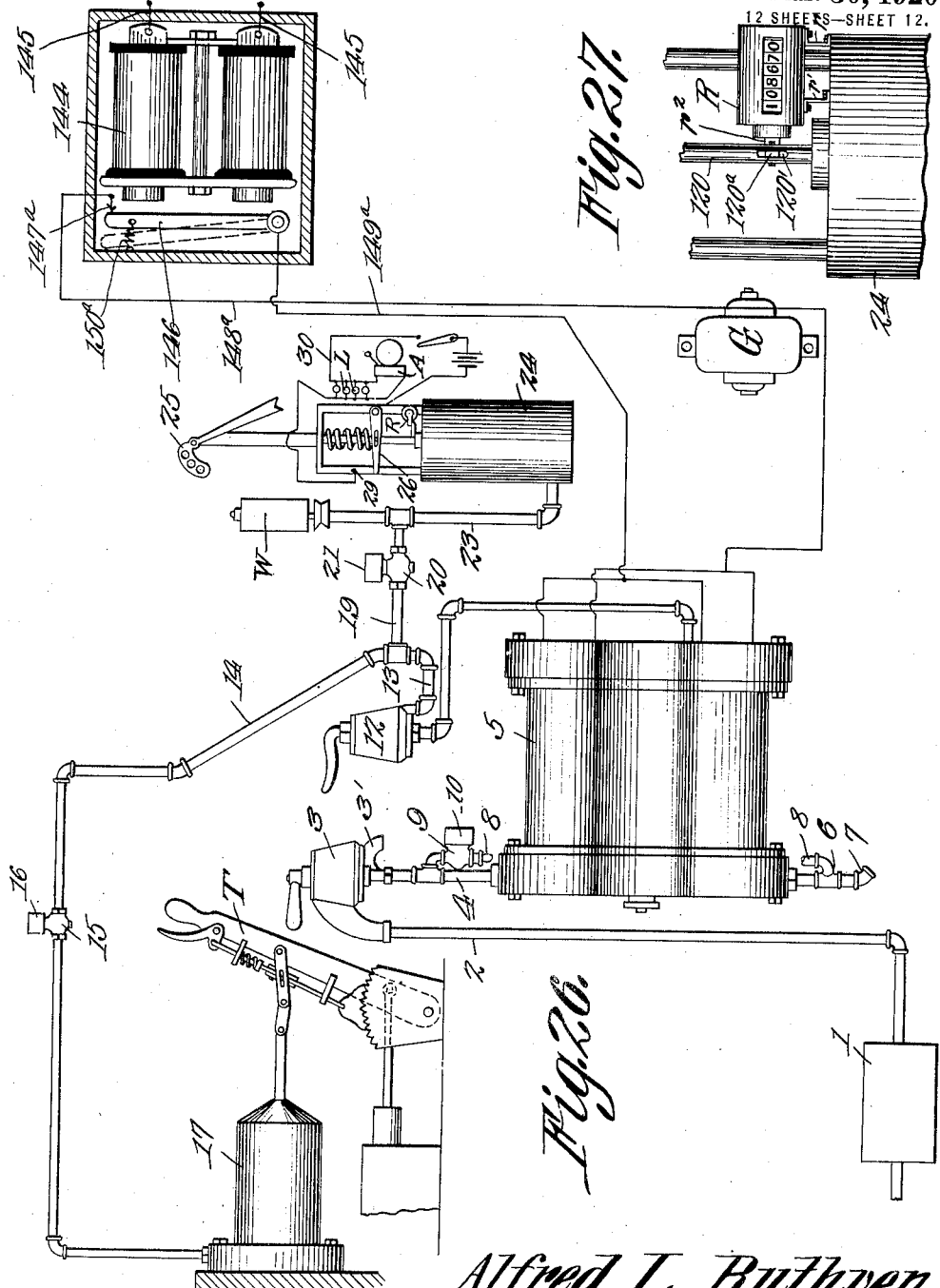

UNITED STATES PATENT OFFICE.

ALFRED L. RUTHVEN, OF KANSAS CITY, MISSOURI.

COMBINATION AUTOMATIC AND MANUAL AIR-BRAKE SYSTEM AND AUTOMATIC TRAIN CONTROL AND SIGNAL MECHANISM.

1,335,260.     Specification of Letters Patent.     Patented Mar. 30, 1920.

Application filed November 4, 1915. Serial No. 59,615.

*To all whom it may concern:*

Be it known that I, ALFRED L. RUTHVEN, a citizen of the United States, residing at Kansas City, in the county of Jackson and State of Missouri, have invented a new and useful Combination Automatic and Manual Air-Brake System and Automatic Train Control and Signal Mechanism, of which the following is a specification.

The present invention relates to the combination of an automatic and manual air brake system, and the combination of an automatic and manual power controlling means, and the automatic means of danger signaling, relating more particularly to the controlling and signaling of power vehicles, such as steam and electric railway trains, one object of the invention being the provision of the combination of an automatic and manual air brake system, by means of which the air brake system is automatically operated by either open or closed electrical track systems or magnetic installations or other electrical control means, there being provided means for preventing the too great bleeding or venting of the air brake system due to an emergency stop, thus conserving a certain amount of the air within the system so that the train may be readily started without any too great delay.

A further object of the present invention is the provision of the combination of an automatic and manually operable engineer's brake valve or brake control mechanism for controlling the vehicle manually or automatically as the conditions may demand.

A further object of the present invention, is the provision of an electro-pneumatic valve mechanism, adapted to be interposed between the engineer's valve and the train pipe of the air brake system, the same being provided with automatic control mechanism to be actuated by a track electric installation or to be operated manually as may be desired, the same in emergency conditions producing an application effect and permitting the train to be brought to a gradual halt without the undue venting of the air brake system.

A still further object of the present invention is the provision of pneumatically operated means controlled through the electro-pneumatic valve mechanism for actuating the controlling mechanism, as for instance the throttle of a steam locomotive, and for simultaneously producing a visual and audible signal to the engineman to indicate the emergency condition.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is described and claimed without departing from the spirit of the invention.

In the drawings—

Figure 1 is a diagrammatic view of an air brake system for a locomotive, its tender and a car or coach, with the present controlling and signaling mechanism in operable relation thereto.

Fig. 2 is an enlarged diagrammatic view partially in section of the controlling mechanism carried by the locomotive with the greater portion of the air brake system eliminated.

Fig. 3 is an enlarged detail sectional view through the main controlling valve of the present invention.

Fig. 4 is a section taken on line 4—4 of Fig. 3.

Fig. 5 is a plan view of one of the heads thereof.

Fig. 6 is a similar view of the opposite head thereof.

Fig. 7 is longitudinal sectional view through a modified form of controlling device.

Fig. 8 is an enlarged detail sectional view of the miniature semaphore carried in the cab of the locomotive showing the electrical visual and audible signal means operated thereby.

Fig. 9 is an enlarged detail side view of the manually controlled valve used in connection with the present controlling mechanism.

Fig. 10 is a vertical central sectional view thereof.

Fig. 11 is a section taken on line 11—11 of Fig. 10.

Fig. 12 is a sectional view through the casing carrying the controlling electromagnet of a closed track circuit.

Fig. 13 is a similar view showing the electromagnets of an open track circuit.

Fig. 14 is a detail sectional view through a second modification of controlling valve mechanism used in connection with the present invention.

Fig. 15 is a similar view to Fig. 14 of still another modified construction of controlling valve mechanism.

Fig. 16 is a vertical central sectional view of still another modification of the controlled electro-pneumatic valve, showing an automatic means for actuating the engineer's valve.

Figs. 17 and 18 are enlarged detail views of the mutilated gear used therewith.

Fig. 19 is an enlarged elevation of the engineer's valve showing the means for attaching the mutilated gear to the stem thereof.

Fig. 20 is a section on line 20—20 of Fig. 19.

Fig. 21 is a view similar to Fig. 16, of another modification having the same function.

Fig. 22 is a vertical section of still another form of electro-pneumatic valve operably connected to the valve as illustrated in my former patent No. 1058107, granted April 8, 1913.

Fig. 23 illustrates another method of operating the valves illustrated in said patent.

Fig. 24 is a fragmentary view in elevation of such valve showing an electro-magnetic means for operating it.

Fig. 25 is a plan view of a form of key to be used with certain of the valves that are to be set by an authorized party.

Fig. 26 is a view similar to Fig. 2 of a closed track circuit control for the present mechanism.

Fig. 27 is an enlarged detail view of the recording device used in connection with the visual signal.

Referring to the drawings, and more particularly to Figs. 1, 2 and 26 thereof, and leaving the detailed constructions of the various parts to be described later on under particular topics, numeral 1 designates the storage tanks of the air brake system, which are supplied with air by the usual steam operated pump P. Where the present system is used in connection with electric railways, such pump P is operated by an electric motor and is controlled automatically as is the usual custom. A pipe 2 is led from the supply or storage tank 1, and has connected therein, the engineer's valve 3, a pipe 4 being led from said valve, and said valve being provided with the venting pipe 3' as usual. Connected to the pipe 4, the purpose of which will presently appear in the detailed description of the various parts or elements of this invention, is the electro-pneumatic controlling valve 5, which has led therefrom the pipe 6, which is connected to the train pipe 7 of the ordinary air brake system for controlling the various brake cylinders B throughout such system.

Connected to the pipes 4 and 6 at opposite sides of the valve 5, is a shunt pipe 8, said pipe being controlled by a valve 9, provided with the key receptacle 10, for the key K, by means of which only an authorized agent, such as the conductor, may operate such valve, thus placing it beyond the control of the engineer or motorman. By this installation of the pipe 8, a means is provided to permit the manual control of the air brake system, in the event that after the train has been stopped automatically, due to an emergency or dangerous condition, and it becomes necessary to move the train, the valve in the pipe 8 may be opened and thus control the air without the air passing through the valve 5.

Leading from the valve 5 at the opposite end to the connections of the pipes or conduits 4 and 6 thereto, is a conduit or pipe 11, leading to the auxiliary engineer's or motorman's brake valve 12, which is of ordinary or special construction and somewhat similar to the valve 3, but may be constructed as particularly illustrated in Figs. 9, 10 and 11, the detail structure of which will be set forth later on. However, it is so constructed as to be in an automatic braking position at all times. Leading from the valve 12, is a pipe or conduit 13, which has branched therefrom, a pipe or conduit 14, provided with a valve 15 therein having the key socket 16, said valve 15 and its socket 16 being similar to the valve 9 and being adapted to be controlled by an authorized agent so as not to be under the control of the engineman or motorman. The pipe 14 conveys pressure fluid to the cylinder 17 which through the flexible links 18 controls the throttle T, which is here shown indicative of any form of controlling means, either the throttle lever of a steam locomotive or the controller of a motor car or electric engine.

A pipe or conduit 19 is also connected to the pipe or conduit 13, and has connected therein a valve 20 having the key receptacle or socket 21, which as in the valves 9 and 15 is adapted to be set and controlled by an authorized agent, and thus removed from the control of the engineer or motorman. The conduit or pipe 19 is connected to the pipe 23, one branch of which is connected to the whistle W, which provides an audible signal while a cylinder 24 receives pressure fluid from the pipe 23, and controls the visual miniature semaphore signal 25. Thus, simultaneously with the actuation of the throttle T, the whistle W and the miniature semaphore 25 are actuated.

In order to further augment the pneumatically controlled audible and visual signals, there is a switch member 26 connected to and controlled by the piston rod 120 of the plunger or piston of the miniature semaphore controlling cylinder 24, the same when elevated closing a circuit including the battery 27, the conductor 28, the switch member 26, the contact 29, the conductor 30, the signal lamps L, which are connected in multiple, the bell or audible alarm A, and the conductor 31, in which is connected the manual switch 32.

In order to provide an electric actuating means for the valve 5, when a track circuit system is used a generator G, which may be indicative of any source of electrical energy, is carried upon the locomotive or vehicle and has led from one terminal thereof, a conductor 33, said conductor 33 being connected to an armature switch 34 within a casing 36, a spring 35 being connected to said switch and normally holding its end in abutment with an armature switch 37 also pivoted in the casing 36. A spring 38 normally pulls the armature switch 37 away from the setting electromagnet 44, while led from the armature switch 37 is a conductor 39, which as will later appear, is connected by the branch conductors 40 to the solenoids 67 and 80' carried by the valve 5, a conductor 41 completing the circuit with the generator G.

In order to provide a means for setting the armature switches 34 and 37, after their automatic operation has brought the train to a stop to avoid disaster, the electromagnet 44 is disposed in attractive relation to the armature switch 37, the circuit being controlled manually and including the generator G, the conductors 32' and 45, the stationary switch point 46 mounted in a casing 47, provided with lock and key, by means of which only an authorized agent may operate said circuit, the switch 48 in said casing and the conductors 49 and 41. The switch 48 and its casing 47 are preferably installed in the cab of the engine from which the conductors 45 and 49 extend. The magnet 44 and the armature switches 37 and 34 are located preferably under the vehicle, and allowed to move close to a stationary magnet 42 which is a part of the road bed equipment, and the conductors 43 of magnet 42 of Fig. 2, are connected to the road bed electric control means, said magnet becoming energized under dangerous conditions and attracting the armature switch 34 so that the spring 38 pulls switch 37 over switch 34 which bears against the insulated end of switch 37, and which in turn opens the circuit to the solenoids of the valve 5 when the vehicle passes over the energized magnet 42, thus causing the operation of the automatic controlling devices. The magnetic control being only one of the many electrical means of influencing the electric pneumatic equalized slide valve, the closed circuit system being the preferred installation as a means of electrical track circuit control.

The mechanism is shown on a large scale in Fig. 2, while the detail structure of the valve 5 shown in both Figs. 1 and 2 is more clearly illustrated in Figs. 3, 4, 5 and 6, this form being the preferred form of the electro-pneumatic valve.

Fig. 12 shows the normally closed track circuit system, the electromagnet 144 taking the place of the magnetic control means as shown in Figs. 1 and 2. When either the devices shown in either Figs. 12 and 13 is in use, magnets 44 and 42 and switch 48 also casing 47 and connections are not used.

In closed circuit systems, a magnet as shown in Fig. 12, may be installed in the vehicle, and the conductors 45' and 33$^a$ of Fig. 12 are connected to conductors 39 and 33 of Figs. 1 and 2, the conductors which energize the magnet 144 Fig. 12, being connected to the normally closed track circuit installation, and when the said circuit becomes interrupted by means of dangerous conditions, the circuit is broken, the magnet 144 becomes deënergized and the armature 146 of the magnet 144 breaks contact with conductor 45', which interrupts the circuit of the solenoids causing the automatic application of the brakes and power controlling means and signaling mechanism.

In Fig. 13 there is shown a magnet 147 that may be used in a normally open track circuit system, in which the presence of danger causes the magnet to become energized, as a result of the completing of the track circuit and attracting the armature 149 from contact with conductor 45$^a$ breaking the solenoid circuit connected with the electro-pneumatic valve, and causing the same results as the breaking of the circuit with the normally closed track circuit system.

In Fig. 26 there is shown a slight modification from the diagram shown in Fig. 2, the electromagnet 144$^a$ corresponding to the electromagnet 144 of Fig. 12, and having led thereto, the conductors 145$^a$ whereby such electromagnet is normally energized to attract the armature switch 146$^a$ and hold the circuit closed against the action of the retractile spring 150$^a$. A contact point 147$^a$ is disposed in the path of the armature switch 146$^a$ so that the circuit from the generator G is closed to properly energize the solenoids with the conductors 148$^a$ and 149$^a$ included in this circuit.

In this installation it is apparent that when the armature 146$^a$ assumes the dotted line position that the circuit to the solenoids of the valve 5 will become deënergized and will be actuated, as heretobefore described, so as to operate the throttling device T, the whistle W and the semaphore 25, at the same time, the recorder R being actuated, while the visual and audible electric signal device will also be actuated.

The electromagnet 144ª is carried by the locomotive or motor car and the conductors 145ª are led to any wireless control means, or to any means whereby current is supplied from a track circuit thereto to normally maintain the electromagnet energized.

*Electropneumatic controlling valve.*

The electropneumatic controlling valve, or electropneumatic equalizing slide valve, in its preferred embodiment, includes the casing or body 50, and the two detachable heads 51 and 52, the casing 50 being bored to provide the three chambers 53, 54 and 55, the former of which chamber 53 constitutes a cylinder for the plunger or piston 69.

Formed in the head 51 is a channel 56, which is interposed between the pipes 4 and 6, to form a communicating medium therebetween, said channel as shown in Fig. 3, being provided with the V-shaped portion 57, the apex of which terminates in the casing 50 at a point in the axis of and spaced from the closed end of the bore or cylinder 53.

A port 58 is led from the channel 56 at a point centrally of the chamber 54, and a pipe 59 is connected to the head 51 in communication with the port 58 and has ports 60 and 61, the port 60 under certain conditions being open so as to permit of air being directed into the chamber 54 to fill it with pressure fluid, the pressure of the air being the same as the pressure in the air brake system. Disposed in the pipe 59 is a partition 62, which divides the ports 60 and 61 from each other so as to prevent inter-communication therebetween. A channel 63 is formed in the head 52 and leads from the end of the pipe 59 secured to head 52 remote from the port 58, through the port 64 into one end of the cylinder 53. Thus, air is permitted to flow under certain conditions as will presently appear, from the port 58 through the pipe 59 and its port 60 into the chamber 54, and under other conditions from the chamber 54 through the port 61 back into the pipe 59 beyond the plug or partition 62 and into the cylinder 53 at the right of the piston 69 so as to move the piston to the emergency position as shown in Fig. 3.

In order to provide means for controlling the ports 60 and 61 so as to cause the alternate opening and closing thereof, the sleeve valve 65 is provided, the same being slidable on pipe 59 and having ports 65′ and 65″ to alternately register with the respective ports 61 and 60. A solenoid 67 is mounted in chamber 54 and has a tubular core 66 united with the valve 65 and slidable on pipe 59. A spring 68 between core 66 and head 52 slides said core and valve 65 to bring ports 65″ and 60 into registration when the solenoid 67 is deënergized, and when the solenoid is energized it attracts the core 66 to bring ports 65′ and 61 into registration so that the pressure fluid will flow through pressure passage or channel 63 into the cylinder 53 to move the piston or plunger 69 therein, thereby moving the stem 70 thereof so that its port 71 will be placed in registration with the portion 57 of channel 56 so that air will pass through the channel 56 from the pipe 6 to the pipe 4, to release the brakes.

A port 76 in head 51 provides for communication between the lower end of the bore 56 and the lower chamber 55 so that air may be admitted in such chamber at system pressure, there being disposed centrally at the axial line of such chamber, a pipe 78 attached to heads 51 and 52, which also constitutes a means for guiding the tubular core 80 of the solenoid 80′ mounted in said chamber. This pipe 78 is provided with a port 77, normally closed by a sleeve valve 79 united with the core 80 and sliding on pipe 78 when the solenoid 80′ is energized. The core is moved to the left by means of the spring 81 when the solenoid 80′ is deënergized, to bring the port 79′ of the valve 79 into registration with the port 77, so that the air or pressure fluid within the chamber 55, will flow into the pipe 78, and its branch 82 and through the port 83 opening into cylinder 53 at the left of the piston 69, moving the piston 69 to the right and causing the port 71 of its stem 70 to be placed out of registration with the bore or channel 57 and thus shutting said channel and closing off the train pipe pressure from the engineer's valve 3. The movement of piston 69 is limited by stops S and S′. When solenoids 67 and 80′ are energized and valves 65 and 79 in the position seen in Fig. 3, the air in chamber 55 is at brake system pressure, but the pressure in chamber 54 is reduced due to the flow of air into the cylinder 53, the air to the left of the piston passing out through the channel 74 until the piston reaches the stop S. Then, when the solenoids are deënergized and valves 65 and 79 released, the air in chamber 55 flows through the pipe or channel 82 into the cylinder 53 and exerts greater pressure against the piston 69 than from the opposite side, thereby moving the piston to the right. As the piston 69 is moved from the position shown in Fig. 3, to the right, its by-pass 72 is placed in registration with the port 73′ of the channel 74—75 in casing 50 and head 52, so that the air within the chamber 55 entering the cylinders 53 at the left of the piston 69 will be permitted escape into the pipe 11 and consequently, at this time, cause the operation of the throttle T under emergency conditions, blow the whistle W, place the miniature semaphore 25 at danger, and where the electrical circuit controlling the visual signals L, and the audible signal A is employed, closing such circuit and thus producing the augmenting signaling within the cab.

Thus it will be seen that under ordinary conditions, the piston 69 due to the energization of both solenoids 67 and 80', will be in the position, as shown in Fig. 3, with the port 71 permitting communication between the pipes 4 and 7, and consequently placing the air brake system under the control of the engineer's valve 3. Under emergency conditions, when the solenoids have been deenergized, and the springs 68 and 81 are brought into play, it is evident that due to the rod 70 closing communication between the engineer's valve 3 and the train pipe, that the control of the brake cylinders throughout the train is removed from the engineer or motorman, and the system will therefore be automatically operated to bring the train to a gradual halt producing a service application instead of a quick venting of the system, the valve 12 as will presently appear, at the proper time or when the pressure has been decreased in the train pipe to a predetermined pressure, operating automatically to stop the flow of pressure fluid from the valve 5 and therefore to the valve 5 from the train pipe, and thus maintaining within the auxiliary reservoirs throughout the train a certain amount of pressure that will permit of the ready free flowing and the placing of the system in an operable condition instead of completely venting the system as is the usual practice with emergency apparatus.

In the form of valve 5 as shown in Fig. 7, the same is composed of casing $50^a$, and heads $51^a$ and $52^a$, but is slightly modified, the electromagnets $67^a$ and $80^b$ being constructed to operate the respective armatures 90 and $90^a$ through the energization of the respective pole pieces or cores $66^a$ and $80^a$ both of which are stationary, electromagnets and not solenoids as heretofore described being used.

In this structure, the port 89 in head $51^a$ leads from the bore $56^a$ in said head into the pipe 96'' of the upper chamber 86, the port 91 of the said pipe 96'' being disposed to normally be opened by the sleeve valve 94 connected to and controlled by the armature $90^a$. The valve 94 is provided with the ports 95 and 95' which are adapted to be alternately placed in registration with the respective ports 96 and 91, said ports being separated by the plug or partition 92 similar to the structure heretofore described. A pipe 97 is led from the pipe 90 at the right of the partition 92 so that the pressure fluid within the chamber 86 when the ports 95 and 96 are in registration will permit of the flow of the pressure fluid into the bore or channel 98 and to the right of the piston $69^a$ so as to hold the same in the position as shown in Fig. 7 with the port $71^a$ of the rod $70^a$ in position to permit of communication between the engineer's valve and the train pipe of the air brake system. The valve 94 is provided with a cross bar 100, which is slidably mounted upon the two pins 101, the springs 102 being provided to move the valve 94 in opposition to the attractive force of the electromagnet $67^a$.

Leading from the bore $56^a$ into the chamber 87, is a port 103, which when the ports 104 and 106 of the valve 105 and pipe 107 respectively, are in registration, will permit the train pipe pressure to enter the pipe 107, and through the port 108 into the cylinder 85 at the left of the piston $69^a$, this action moving the piston $69^a$ to the right so that the port $71^a$ will be placed out of registration with the channel $56^a$ thereby shutting off the train pipe from the engineer's valve as in the other instance, and placing the by-pass $72^a$ in registration with the channel 109 to permit the passage of the pressure fluid into the pipe 11 and cause the operation of the throttle, and the production of visual and audible signals in the cab.

As shown in Fig. 14, the valve $5^b$, is constructed similarly to that shown in Fig. 3, except that the head $51^b$ is cast integral and not separable, the other details being essentially the same.

In the form shown in Fig. 15, the main essentials of the valve as shown in Fig. 3, are carried out, except that the port 83', is directly through the head of the cylinder 53', and the channel 74 is led through the head $52^b$ at the upper end thereof, instead of through the base.

In all the forms, the stopping or limiting means S—S' are employed so as to limit the sliding movement of the respective pistons within their cylinders.

*Throttle control.*

The throttle control, as clearly illustrated in Fig. 2, is somewhat similar to the control shown in my Patent No. 1,058,107, except that the cylinder 17 thereof is secured fixedly to the head of the boiler or other support and is provided with the channel 110 which is in communication with the pipe 14. The port 111 opens into the cylinder or chamber 112 at the extreme right thereof so as to move the piston 113 to the left beyond the venting or exhaust port 114, so that the toggle links 118, one of which is pivotally connected to the throttle lever T, are straightened, and consequently the rod 115 controlling the detent 116 is elevated to remove the detent 116 from engagement with the segment 116' and thus the throttle T is automatically moved to the left as viewed in Fig. 2, to cut off the motive power.

*Visual and audible signals.*

As clearly shown in Fig. 8, the cylinder 24 is provided with a chamber 117, in which is mounted for vertical sliding movement, the piston 118', the conduit 23 for supplying pressure fluid therebelow being in communication at the lower end of the chamber 117. An exhaust port 119 is provided so that when the piston 118' is moved upwardly in extreme position, the pressure fluid below the same will be exhausted. The rod 120 carried by the piston 118', is mounted in the tube 121 and is operably connected by means of the link 122 to the miniature semaphore 25. Thus when the semaphore is in the position as shown in Fig. 8, a clear signal is given, while when the pressure elevates the piston 118', and the semaphore is moved to the dotted position, a danger signal is given. The spring 123 assists in holding the piston 118' in its lowermost or clear signaling position.

*Recording device.*

As clearly illustrated in Fig. 27, the recorder R is supported upon brackets or supports $r$—$r'$ above the cylinder 24 and the same contains a plurality of rotating disks of the "Veeder" type, for carrying the digits to indicate the number of revolutions, the stem $r^2$ being provided with a lever 120ª which is projected through the slot 120' of the rod 120 and connected thereto, so that at each reciprocation of the rod 120, the unit disk of the recorder will be actuated one digit, the disk in the present instance being constructed to indicate 999—999.

It will thus be seen with this structure that the actuation of the semaphore 25 which will be operated at each time that the system is automatically actuated due to an abnormal or danger condition will be operated and thus record the number of operations thereof.

*Auxiliary valve.*

As clearly shown in Figs. 9, 10 and 11, the auxiliary valve 12, is preferably constructed to have a channel 124 formed therein for connection to the pipe or conduit 11. A valve 125 separates the channels 124 and 132 and is held in closed position and closes the channel 124 to retain the air brake pressure of a predetermined amount within the train pipe and yet under normal conditions with the pressure at normal, for ordinary braking operations, said valve 125 is pushed open by the pressure from the pipe 11 to permit of communication between the channels 124 and 132. The stem 126 of the valve 125 has mounted thereon a spring 127, which is controlled and adjusted by means of the plug 128 in the threaded bore 129 to move to the right and close the channel 124 when the air brake system has been vented to a predetermined low pressure, as before stated under normal conditions permitting of the proper flowing of the air through the casing 12. A cap 130 is placed to protect the valve plug 128 and is provided with the venting screw 131.

At the upper end of the channel 132 are provided the two ports 133 and 134, the port 133 being disposed to register with the port 138 of the valve stem 136, which is operated in one way by the handle 137 in position to be manipulated by the engineer or motorman, the spring 143 normally holding the port 138 in registration with the port 133 so that the pressure fluid is permitted to flow from the bore 132 into the bore 140 and consequently to the throttle control and signaling means within the cab. Thus the valve stem 135 is normally held in braking position by means of the spring 143 which is so secured in the casing 12 and to the lower end of the stem, as to exert a tension to so position the stem. A port 141 is formed in the valve stem 135, and is disposed to permit of communication between the ports 134 and 142 so as to augment the passage produced by the port 138, and when desired, the stem 136 is manipulated by the engineman through the instrumentality of the handle 137 to thus permit him to bring the train to a more rapid halt if necessary.

Thus under ordinary conditions, the stem 136 when the respective electro-pneumatic valves 65—79 are operated by their springs due to the deënergization of the electromagnets or solenoids thereof, to permit of the proper venting of the air through the valve 12 and the pipe 13 to the throttle control and signaling mechanism, should the engineman or motorman desire to bring the train to a more rapid halt, the stem 136 is operated manually to place the port 141 in registration with the ports 134 and 142 and thus produce a quicker venting due to the increased area of portage, the release of the handle permitting the spring 143 to again place the port 138 as the only port in communication between the channels 132 and 140.

With this system, it is intended that the electrical control for the solenoids or electromagnets of the electro-pneumatic controlling valves, may be either actuated in a closed or open track circuit, or magnetic track circuit, the structure heretofore described and illustrated being operated by the closed circuit in which the electromagnet 144, Fig. 12, is normally energized, the electromagnets being clearly illustrated in Figs. 12 and 13.

The removal of the obstacle or danger which means a clear right of way, causes the armature 146 of Fig. 12, or the armature 149 of Fig. 13, to be restored automatically to its normal position by the energizing of magnet 144 Fig. 12, or the deënergizing of magnet 147 Fig. 13, which may be controlled by any sort of electrical track circuit or by wireless means (not shown) that may be connected to the said magnets by the conductors or wires 145, Figs. 12 and 148 of Fig. 13, the said magnet 144 of Fig. 12 being better shown in Fig. 26. When the said magnet 144$^a$ as shown in Fig 26 which represents a closed track circuit system is deënergized, the complete automatic operation of the air brake system and automatic train control, or power controlling means and signaling means, are in operation as the result of interrupting the electro-pneumatic valve circuit in casing 5 and therefore a reversed action takes place automatically immediately after the obstacle of danger has been removed to in turn provide a clear right of way for the vehicle to proceed. The clearing of the right of way automatically closes or completes all electrical circuits, restoring all magnets, and armatures and valves to their normal position which gives the clear signal, and provides complete manual control as shown, as long as the right of way is clear and free of any danger whatsoever.

In the form shown in Fig. 12, the electro-magnet 144 is normally energized through its conductors 145 and the source of electrical energy (not shown) to hold the armature 146 in closed position between the conductors 33$^a$ and 45′.

In the form shown in Fig. 13, the electro-magnet 147 is in a normally open circuit controlled by the conductors 148 and their sources and other controlling mechanism (not shown), the spring moved armature 149 being normally in the position as shown and closing the circuit including the conductors 33$^b$ and 45$^a$.

*Combination automatic and manual controlled engineer's brake valve.*

In the structure illustrated in Figs. 16, 17, 18, 19 and 20, the engineer's valve 3$^a$ is connected to the main supply pipe 2$^a$ and to the train pipe 4$^a$, the electro-pneumatic controlling valve 5$^d$ being connected to permit of the air from the storage tank through the pipe 2$^a$ entering the pipe 8$^a$ and the channel 157 of the valve to, as will presently appear, fill the chambers 161 and 162 controlled by the respective electro-pneumatic valves 163 and 164. Led from the engineer's valve 3$^a$ is the exhaust pipe 150, which is connected to the channel 151 of the valve 5$^d$, the parts normally being in the position as shown in Fig. 16, with the port 152 registering with the channel 151 and the exhaust pipe 154 so that when the engineer manually operates the valve 3$^a$, the air brake system will exhaust through the pipe 154. When the parts are in the position as shown in Fig. 16, such position being the normal position, the solenoids of the electro-pneumatic valves 163 and 164 are energized and therefore, the piston 155 is in the position as shown, so that air is permitted to flow from the pipe 2$^a$ through the pipe 8$^a$ and the channel 157 to the branch 159 through the port 160 of the stem or rod 170 into the chamber 162 controlled by the electro-pneumatic valve 164. When the electro-pneumatic valves 163 and 164 become deënergized and actuated by their respective springs as heretofore described, so that air is admitted to the under side of the piston 155 controlled by the electro-pneumatic valve 164 and the piston is elevated so that the port 152 is placed in registration with the branch 151$^a$ and consequently the exhausted air from the pipe 150 is directed to the pipe 156 which operates the throttle and signal controlling mechanism heretofore described. At the same time, the rod 170 is elevated and the port 160 is placed in registration with the conduit 158, so that air from the pipe 8$^a$ is conducted into the chamber 161 through the port 158, consequently filling the chamber 161. At the time that the rod 170 was elevated, its rack 165 rotated the pinion 166 and consequently the shaft 167 and as this shaft 167 drives the bevel gear 168, which is in mesh with the geared segment 169, the said segment through the projection or pin 170 fitted within the elongated slot 171 of the stem 172 operates such stem after the segment 169 was moved in the direction of the arrow as indicated in Fig. 17 so as to abut the opposite end of the slot 171 and consequently rotate such stem 172 and place the engineer's valve 3$^a$ in emergency position. Thus the engineer's valve is automatically operated and is so retained until the electro-pneumatic valves 163 and 164 are again restored due to the removal of a danger condition, at which time the valve 3$^a$ may be manipulated manually. It will thus be seen that by means of the pin 170 and the slot 171, that the valve 3$^a$ may be operated manually without interfering with the automatic mechanism, and with part 152 in register with channel 151, the valve 3$^a$ can be operated without the exhaust fluid operating the signals and throttle.

In the structure shown in Fig. 21, the mechanism for automatically operating the engineer's valve, is entirely electric and the pneumatic mechanism is dispensed with. In this instance, the valve 5$^e$ is provided with the upper and lower chambers 173 and 174 and with the reciprocatory stem 175, said stem being provided with a valve port 176 for controlling the channels 180 and 182 and itself being controlled by the core 177 of the solenoid 178, the spring 179 being mounted to oppose the action of the solenoid 178. Thus when the solenoid is energized and under normal conditions, the port 176 permits the passage of pressure fluid or air from the exhaust pipe 150' of the engineer's valve 3ᵇ through the exhaust outlet 181, the deënergization of the solenoid 178 due to an emergency or danger condition, permitting the spring 179 to move the rod 175 downwardly to place the port 176 to permit the passage of the exhausting fluid from the pipe 151 through the channel 182 and the pipe 183 to the throttle control and signaling mechanism heretofore described. In this instance, the rod 175 in the chamber 174 is provided with the rack teeth 165' which operate the pinion 166' and the shaft 177' which carries the gear 168'. This gear operates the segmental gear 169' which is similar to the gear 169 and is mounted on the stem of the valve 3ᵇ as heretofore described.

In the forms shown in Figs. 22, 23 and 24, the two valves 184 and 186 which are similar to the valves for controlling the train pipe and the pipe leading to the throttle and signal control mentioned in my before mentioned patent, are operated by different mechanisms. In the structure shown in Fig. 22, the electro-pneumatic valve 5ᶠ which contains the two electro-pneumatic valves 189 and 190, operate the plunger 191 and its rod 192, so that the port 193 therein will be placed in registration with either one of the channels 194 and 195, so that the respective chambers of the valves 189 and 190 may be filled with the pressure fluid and also so that the piston or plunger 191 may be operated to either extreme position, the exhaust port 300 being provided to permit of the bleeding of the chamber above or below the plunger 191 at either extreme position thereof. Under normal conditions, the valve 184 is opened and the valve 186 is closed, thus permitting the air from the storage tank to flow through the pipe 2ᵇ to the engineer's valve (not shown) and back through the pipe 4ᵇ to the train pipe (not shown). A branch from the pipe 4ᵇ is the pipe 185, in which is mounted the normally closed valve 186, said pipe 185 leading to such throttle and signal controlling mechanism heretofore described.

With the electro-pneumatic valves 189 and 190 energized, the parts normally assume the position as shown in Fig. 22, the deënergization thereof permitting the pressure fluid to enter below the plunger 191 to elevate the same placing the port 193 in registration with the channel 194 so that pressure fluid led from the pipe 2ᵇ through the pipe 187 will be conducted into the chamber of the valve 189 and shut off from the chamber of the valve 190. At the same time, the rack 196 carried by the rod 192 will rotate the pinion 197 and through the stem 198 close the valve 184 and open the valve 186 and consequently shut off the train pipe from the engineer's valve and the pipe 2ᵇ and open the train pipe through the pipe 185 and consequently to the throttle controlling and signaling mechanism heretofore described.

In the structure shown in Fig. 23, the electro-pneumatic valve mechanism 5ᵍ, is similar to that shown in Fig. 22, except that the rod 192 operated by the plunger carries the pin 199 which operates in the slot 200 of the crank or arm 201 which is connected to the valve stem 198' similar to the stem 198 heretofore described for operating the two valves.

In the structure shown in Fig. 24, the pneumatic mechanism is entirely dispensed with, the stem 198ᵃ of the two valves being provided with a slotted crank 201ᵃ operated by a pin 199' carried by the rod 192' which is operably connected to the core 202 of the solenoid 203, a spring being operably connected to the core within the solenoid for moving the same in opposition to the energized solenoid.

What is claimed is:

1. In combination, an air brake system having a train pipe, an engineer's valve, a casing having a port forming a communicating medium between the train pipe and the engineer's valve, a piston mounted in the casing and having a valve to control said port, and two automatic valves mounted in the casing to control the flow of pressure fluid from the train pipe at opposite sides of the valve controlled port to the opposite sides of the piston, said piston also controlling a vent for the train pipe when the automatic valves are operated.

2. In combination, an air brake system having a train pipe, an engineer's valve, a casing having a port forming a communicating medium between the train pipe and the engineer's valve, a piston mounted in the casing and having a valve to control said port, two automatic valves mounted in the casing to control the flow of pressure fluid from the train pipe at opposite sides of the valve controlled port to the opposite sides of the piston, said piston also controlling a vent for the train pipe when the automatic valves are operated, each of the last valves including a solenoid, a core forming one valve member, and a spring for operating the core in opposition to the current.

3. The combination with an electrical track circuit, of a vehicle carried circuit, means responsive to the track circuit for controlling the vehicle carried circuit, an air brake system carried by the vehicle and having a train pipe and an engineer's valve, a pneumatic valve interposed between the train pipe and engineer's valve, two valves one at each side of the pneumatic valve for controlling air pressure from the system to operate the pneumatic valve, the pneumatic valve normally being open, electrical and spring actuated means for controlling each of the two valves, the electrical part of each being in the vehicle carried circuit and normally energized, whereby when the vehicle carried circuit is open, the two valves are spring actuated, the engineer's valve is isolated from the system and the train pipe is vented.

4. In combination, an air brake system having a train pipe, an engineer's valve, a casing having a port forming a communicating medium between the train pipe and the engineer's valve, a piston mounted in the casing and having a valve to control said port, two automatic valves mounted in the casing to control the flow of pressure fluid from the train pipe at opposite sides of the valve controlled port to the opposite sides of the piston, said piston also controlling a vent for the train pipe when the automatic valves are operated, and a valve controlled pipe connecting the train pipe and the engineer's valve at opposite sides of the casing.

5. In combination, an air brake system having a train pipe, an engineer's valve, a casing having a port forming a communicating medium between the train pipe and the engineer's valve, a piston mounted in the casing and having a valve to control said port, two automatic valves mounted in the casing to control the flow of pressure fluid from the train pipe at opposite sides of the valve controlled port to the opposite sides of the piston, said piston also controlling a vent for the train pipe when the automatic valves are operated, each of the last valves including a solenoid, a core forming one valve member, a spring for operating the core in opposition to the current, and a valve controlled pipe connecting the train pipe and the engineer's valve at opposite sides of the casing.

6. The combination with an electrical track circuit, of a vehicle carried circuit, means responsive to the track circuit for controlling the vehicle carried circuit, an air brake system carried by the vehicle and having a train pipe and an engineer's valve, a pneumatic valve interposed between the train pipe and engineer's valve, two valves one at each side of the pneumatic valve for controlling air pressure from the system to operate the pneumatic valve, the pneumatic valve normally being open, electrical and spring actuated means for controlling each of the two valves, the electrical part of each being in the vehicle carried circuit and normally energized, whereby when the vehicle carried circuit is open, the two valves are spring actuated, the engineer's valve is isolated from the system and the train pipe is vented, and a valve controlled pipe connecting the train pipe and the engineer's valve at opposite sides of the casing.

7. The combination with an air brake system having an engineer's valve and a train pipe, of an automatic control valve interposed between the engineer's valve and the train pipe and including a casing provided with three chambers, a piston disposed in one chamber, such chamber being in communication at its ends with the other chambers respectively, a valve connected to the piston for controlling the communication between the train pipe and the engineer's valve, one of the other chambers being in communication with the train pipe at a point between the piston valve and the engineer's valve, while the other chamber is in communication with the train pipe at the other side of the piston valve, and two electro-spring actuated valves, one in each of the latter chambers for controlling the direction of pressure fluid to the piston valve, the chamber for the piston valve controlling the exhaust for the train pipe when the air brake is automatically operated.

8. The combination with an air brake system having an engineer's valve and a train pipe, of an automatic control valve interposed between the engineer's valve and the train pipe and including a casing provided with three chambers, a piston disposed in one chamber, such chamber being in communication at its ends with the other chambers respectively, a valve connected to the piston for controlling the communication between the train pipe and the engineer's valve, one of the other chambers being in communication with the train pipe at a point between the piston valve and the engineer's valve, while the other chamber is in communication with the train pipe at the other side of the piston valve, two electro-spring actuated valves, one in each of the latter chambers for controlling the direction of pressure fluid to the piston valve, the chamber for the piston valve controlling the exhaust from the train pipe when the air brake is automatically operated, and a valved pipe connected to the train pipe as a by-pass around the automatic control valve.

9. In a train control mechanism, the combination of an air brake system having a train pipe and an engineer's valve, a casing having a port connected in the train pipe between the train pipe and the engineer's valve, a pneumatic valve mounted in the casing to control said port, an electrically and spring actuated valve for controlling the supply of air pressure to the pneumatic valve also mounted in the casing to control the flow of air from the air brake system, an electrical circuit including the electromagnet of the valve and a source of electrical energy, means in said circuit controlled from a distant point, the pneumatic valve when the circuit is closed, maintaining the train pipe open to the engineer's valve, said pneumatic valve when the circuit is open closing the train pipe to the engineer's valve while the spring actuates its valve to direct the air to the pneumatic valve and exhaust air from the train pipe.

10. In a train control mechanism, the combination of an air brake system having a train pipe and an engineer's valve, a casing having a port connected to the train pipe between the train pipe and the engineer's valve, a pneumatic valve mounted in the casing to control said port, an electrically and spring actuated valve for controlling the supply of air pressure to the pneumatic valve also mounted in the casing to control the flow of air from the air brake system, an electrical circuit including the electromagnet of the valve and a source of electrical energy, means in said circuit controlled from a distant point, the pneumatic valve when the circuit is closed, maintaining the train pipe open to the engineer's valve, said pneumatic valve when the circuit is open closing the train pipe to the engineer's valve while the spring actuates its valve to direct the air to the pneumatic valve and exhaust air from the train pipe, power controlling means actuated by the exhaust air when the pneumatic valve is operated to isolate the engineer's valve, and a valved pipe connected to the train pipe as a by-pass around the pneumatic valve.

11. In a mechanism of the character described, a brake pipe, means for supplying pressure fluid thereto, a valve between said means and pipe, and automatically operating means for said valve supplied with pressure fluid from said means at one side of the valve to open the valve and supplied with pressure fluid from said pipe at the other side of the valve to close the valve, and operable to permit the flow of air from said pipe when the valve is closed.

12. In a mechanism of the character described, a brake pipe, means for supplying pressure fluid thereto, a valve between said means and pipe, pressure fluid operative means controlling said valve, automatically controlled means supplied with pressure fluid from the first mentioned means at one side of said valve to operate the second mentioned means for opening the valve, and automatically controlled means supplied with pressure fluid from said pipe at the other side of the valve for operating the second mentioned means to close the valve and permit the pressure fluid to flow from said pipe.

13. In a mechanism of the character described, a brake pipe, means for supplying pressure fluid thereto, a valve between said means and pipe, pressure fluid operative means controlling said valve, two pressure fluid chambers, one supplied with pressure fluid from said means at one side of the valve and the other supplied with pressure fluid from said pipe at the other side of the valve, means operable for shutting off the flow of pressure fluid into the first mentioned chamber and establishing the flow of pressure fluid to the second mentioned means for opening the valve, and means operable for establishing the flow of pressure fluid from the second mentioned chamber to the second mentioned means for closing the valve and permitting the pressure fluid to escape from said pipe.

14. In a mechanism of the character described, a brake pipe, means for supplying pressure fluid thereto, a valve between said means and pipe, pressure fluid operated means for operating said valve including a movable member connected thereto, and having an exhaust port uncovered when said member has moved to close said valve, and means for establishing communication between said pressure fluid operated means and brake pipe to move said member for closing the valve and then uncovering said exhaust port, and also including in combination power controlling means connected to said exhaust port to be operated by the exhaust pressure fluid and having an exhaust port for the exhaust of pressure fluid after the power interrupting means has been applied.

15. In a mechanism of the character described, a source of pressure fluid, a chamber receiving pressure fluid from said source, train controlling means operated by pressure fluid from said chamber, a valve controlling the flow of pressure fluid between said chamber and train controlling means and located entirely within said chamber to equalize the pressure on said valve, pressure fluid means for operating said valve, and spring actuated means controlling the pressure fluid.

16. In a mechanism of the character described, a source of pressure fluid, a chamber receiving pressure fluid from said source, train controlling means operated by pressure fluid from said chamber, a valve controlling the flow of pressure fluid between said chamber and train controlling means and located entirely within said chamber to equalize the pressure on said valve, and electro-magnetic means in said chamber for influencing said valve to operate it.

17. In a mechanism of the character described, a source of pressure fluid, a chamber receiving pressure fluid from said source, train controlling means operated by pressure fluid from said chamber, a valve controlling the flow of pressure fluid between said chamber and train controlling means and located entirely within said chamber to equalize the pressure on said valve, said valve being in the form of a solenoid core, and a solenoid for operating said valve.

18. In a mechanism of the character described, a source of pressure fluid, a chamber supplied with pressure fluid from said source, pressure fluid operated train controlling means connected to said chamber, a pipe in said chamber, a tubular valve slidable on said pipe for controlling the flow of pressure fluid from said chamber to said controlling means and constituting a solenoid core, and a solenoid within said chamber surrounding said valve for operating it.

19. In a mechanism of the character described, a throttle lever, a train controlling member, a flexible link connection between the member and the lever whereby actuation of the member draws the link to raise the latch of the lever and throw the lever, and means for actuating the member.

20. In an apparatus of the character described, a fluid pressure casing, and electrically and spring actuated valves in the casing and alternately movable, there being equal air pressure surrounding the movable parts of the valve and a piston slide valve within said casing, there being ports for maintaining communication between the piston slide valve and the other valves.

21. In an apparatus of the character described, a fluid pressure casing, electrically operated valves therein, there being equal air pressure surrounding the movable parts to permit free movement thereof of the valves in either direction, and a pressure fluid actuated valve in communication with the other valves.

22. In an automatic train control device, a fluid pressure casing, electrically and spring actuated valves within the casing, a pressure fluid actuated valve in communication with the other valves, power controlling and braking means, and automatic actuating means for receiving pressure from the pressure fluid actuated valve.

23. In an automatic train control device, a fluid pressure casing, electrically and spring actuated valves mounted in the casing, a pressure fluid actuated valve shiftable to open and close ports within the casing, stationary track magnets, said electrically actuated valves having armatures in their circuits adapted to travel within magnetic fields of the track magnets and adapted to be interrupted by the track magnets under danger conditions and when the vehicle is passing over the track magnets.

24. In an automatic train control device, a fluid pressure casing, electrically actuated valves movably mounted therein, a fluid pressure actuated valve in communication with the other valves, there being ports controlled by the fluid pressure actuated valve, propelling mechanism, a throttle pawl and means for automatically releasing the pawl.

25. In an automatic train control apparatus a fluid pressure casing, electrically and spring actuating valves in the casing and slidably mounted on stationary cores, said cores being provided with ports, there being additional ports in the movable portions of the valves shiftable into and out of communication with the ports in the cores, a pressure fluid actuated valve controlled by said ports, an engineer's brake valve, said pressure fluid actuated valve being movable under danger conditions to interrupt a source of pressure fluid supply and to provide means for directing pressure to interrupt the power and move the brake to braking position.

In testimony that I claim the foregoing as my own, I have hereto affixed my signature in the presence of two witnesses.

ALFRED L. RUTHVEN.

Witnesses:
 EVELYN RUTHVEN,
 GEORGE P. WESTERFIELD.